(12) United States Patent
Linderholm et al.

(10) Patent No.: US 6,877,936 B2
(45) Date of Patent: Apr. 12, 2005

(54) METHOD AND APPARATUS FOR PRODUCING A HOLE IN A WORKPIECE

(75) Inventors: Dag G. Linderholm, Ronninge (SE); Bjorn Pettersson, Jarfalla (SE)

(73) Assignee: Novator AB, Spanga (SE)

( * ) Notice: Subject to any disclaimer, the term of this patent is extended or adjusted under 35 U.S.C. 154(b) by 264 days.

(21) Appl. No.: 10/193,374

(22) Filed: Jul. 11, 2002

(65) Prior Publication Data

US 2003/0012615 A1 Jan. 16, 2003

Related U.S. Application Data

(60) Provisional application No. 60/304,618, filed on Jul. 11, 2001.

(51) Int. Cl.[7] .............................................. B23B 35/00
(52) U.S. Cl. ....................... 408/1 R; 409/200; 409/201; 409/231; 82/1.4; 408/236
(58) Field of Search ................................ 408/1 R, 124, 408/88, 110, 150, 151, 236, 234; 409/200, 201, 216, 204, 231; 82/1.11, 1.2, 1.5, 1.4

(56) References Cited

U.S. PATENT DOCUMENTS

| | | | | |
|---|---|---|---|---|
| 1,634,322 A | * | 7/1927 | Dornes, Jr. .................. | 409/230 |
| 1,989,227 A | * | 1/1935 | Craley .......................... | 82/1.5 |
| 2,499,842 A | * | 3/1950 | Armitage ..................... | 409/199 |
| 2,519,476 A | * | 8/1950 | Kind ........................... | 408/159 |
| 3,690,220 A | * | 9/1972 | Escobedo .................... | 409/211 |
| 4,245,939 A | * | 1/1981 | Sear ............................ | 409/191 |
| 4,370,080 A | * | 1/1983 | Goode ........................ | 409/200 |
| 4,487,275 A | * | 12/1984 | Froehlich ..................... | 175/170 |
| 4,508,476 A | * | 4/1985 | Kalokhe ...................... | 408/156 |
| 5,462,393 A | * | 10/1995 | Eischeid ...................... | 408/159 |
| 5,664,308 A | * | 9/1997 | Deitert ......................... | 29/40 |
| 5,769,576 A | * | 6/1998 | Gerard et al. ............... | 408/83.5 |
| 5,829,928 A | * | 11/1998 | Harmand et al. ........... | 408/83.5 |
| 5,971,678 A | * | 10/1999 | Linderholm ................. | 409/132 |
| 2001/0022122 A1 | * | 9/2001 | Kawai et al. ................ | 82/1.11 |

FOREIGN PATENT DOCUMENTS

| | | | | |
|---|---|---|---|---|
| JP | 61-152304 | * | 7/1986 | |
| JP | 07148604 A | * | 6/1995 | ......... B23B/29/034 |
| SU | 0891260 | * | 12/1981 | |
| WO | WO 03/006196 | * | 1/2003 | |

* cited by examiner

*Primary Examiner*—Daniel W. Howell
(74) *Attorney, Agent, or Firm*—Taylor & Aust, P.C.

(57) ABSTRACT

A method and apparatus for producing conical holes in a workpiece by using a substantially cylindrical cutting tool having a cutting head diameter essentially smaller than the top and bottom diameter of the hole to be formed. The method comprises the steps of positioning the longitudinal center axis of the cutting tool at an angle, which is offset from a normal to a flat surface of the workpiece such that the inclination of the longitudinal axis of the cutting tool substantially corresponds to the desired inclination of the wall of the conical hole to be formed, rotating the cutting tool about its longitudinal center axis, moving the cutting tool in a circular path about a principal axis corresponding to the longitudinal center axis of the hole to be machined, and feeding the cutting tool in its longitudinal direction towards and into the workpiece.

5 Claims, 3 Drawing Sheets

METHOD AND APPARATUS FOR PRODUCING A HOLE IN A WORKPIECE

This application claims the benefit of Provisional Application No. 60/304,618, filed Jul. 11, 2001.

BACKGROUND OF THE INVENTION

1. Field of the Invention

The invention generally relates to a method and a numerically controlled orbital machining apparatus for producing a hole in a workpiece by means of a cutting tool rotating about its own tool axis as well as eccentrically (orbiting) about a principal axis corresponding to the longitudinal center axis of the hole to be machined. More particularly, the invention relates to a method and an apparatus for producing a conical hole, or a hole or recess having at least a one conical section, in a workpiece by using a substantially cylindrical cutting tool having a cutting head diameter essentially smaller than the top and bottom diameter of the hole to be formed.

The invention also relates to a method and an apparatus for forming holes in a workpiece, where the wall of said holes have a curved profile, such as holes having convex or concave wall sections.

2. Description of the Related Art

Conventionally, conical holes in a workpiece are produced by the combined action of rotating a conical cutting tool (cutting head) having tapered cutting edges and feeding the tool into the workpiece. Such conical tools must have a shape and dimensions, which accurately correspond to the final dimension of the hole to be drilled. Such conical tools are expensive and may not be reground many times due to diminishing dimensions, which makes the tool quickly useless for further use.

WO 99/62661 discloses an orbital machining apparatus, which is equipped with structural features making it possible to produce conical holes in a workpiece. For this purpose the apparatus comprises a radial offset adjustment mechanism, which may continuously vary the radial offset value (orbiting radius of the tool) while simultaneously rotating the cutting tool about its own center axis and axially feeding the tool into the workpiece. Although conical holes may be produced here by using a substantially cylindrical cutting tool, it is in many instances difficult to obtain a sufficiently fine smoothness of the hole surface.

SUMMARY OF THE INVENTION

An object of the present invention is to provide a method which makes it possible to produce high quality conical holes in a workpiece by using a cutting tool with a cutting head having cylindrically or substantially cylindrically orientated cutting edges, i.e. a constant or substantially constant cutting head diameter, which is essentially smaller than the top and bottom diameter of the conical hole to be produced.

For this purpose the method of the present invention comprises the steps of:

a) positioning the longitudinal center axis of the cutting tool at an angle, which is offset from a normal to the surface of the workpiece, i.e. is inclined thereto, such that the inclination of the longitudinal axis of the cutting tool substantially corresponds to the desired inclination of the wall of the conical hole, i.e. substantially corresponds to half of the cone angle of the hole to be formed;

b) rotating the cutting tool about its longitudinal center axis;

c) eccentrically moving (orbiting) the cutting tool about the longitudinal center axis of the hole to be formed; and d) feeding the cutting tool axially in its longitudinal direction towards and into the workpiece to form a conical hole or conical hole section therein.

This method offers distinct advantages over conventional methods of forming conical holes or recesses, namely:

1) An inexpensive cylindrical cutting tool may be used, and there is no need for a conical cutting head. Thus, the tooling costs are substantially reduced.

2) The smoothness of the hole surface will be essentially improved owing to an axial feed of the cutting tool, where a greater length of the cutting edges of the tool is engaging the workpiece during the hole forming procedure. A single tool of a unitary geometry may be used for machining holes of different sizes.

3) The tool can be reground (sharpened) many times, as the resulting reduction of the cutting head diameter can easily be compensated for by increasing the radial offset of the cutting tool.

4) Holes having an upper diameter, which is smaller than the bottom diameter, can be produced by offsetting the cutting tool axis to a negative value.

5) By varying the angle of inclination of the tool axis during the axial feed of the tool, holes having convex and/or concave (curved) wall sections may be formed as well.

The apparatus of the present invention comprises:

a first actuator including a spindle unit for carrying and rotating a cutting tool about a longitudinal center axis of the tool;

a second actuator for moving the cutting tool in an axial feed direction;

a mechanism for rotating the cutting tool eccentrically about a principal axis corresponding to the center axis of the hole to be formed; and a mechanism for setting the angle (inclination) of the tool axis relative to the principal axis.

According to a first embodiment of the apparatus of the present invention the mechanism for setting the angle (inclination) of the tool axis relative to the principal axis comprises an exchangeable member which has a flat surface oriented at a fixed angle of inclination relative to a plane perpendicular to said principal axis, said angle corresponding to the desired inclination of said cutting tool axis.

According to a further embodiment of the apparatus of the invention the mechanism for setting the angle of the tool axis relative to the principal axis comprises an inner cylindrical sleeve having a longitudinal through-hole, the center axis of said hole being inclined an angle relative to the center axis of the inner cylindrical sleeve. The hole of the inner sleeve is adapted to radially and axially guide a spindle unit for rotating said cutting tool about its longitudinal center axis. The inner cylindrical sleeve is rotatably supported in a longitudinal hole of an outer cylindrical sleeve. The center axis of the hole of the outer sleeve is likewise inclined an angle relative to the center axis of the outer sleeve. Owing to a suitable choice of the geometric parameters of the inner and outer sleeves, of the mutual positions of the holes therein as well as of the angles of inclination of said holes, the center axis of the hole of the inner sleeve, and thus the center axis of the cutting tool radially guided thereby, may be adjusted by rotating the inner sleeve 180° within the outer sleeve between a position in which the center axis of the cutting tool is oriented perpendicular to the upper surface of the workpiece and coaxial with the center axis of the outer sleeve, i.e. with a tool axis inclination a=0, and a position with a maximum tool axis inclination corresponding to the sum of the angles of inclination of the holes in the inner and outer cylindrical sleeves

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
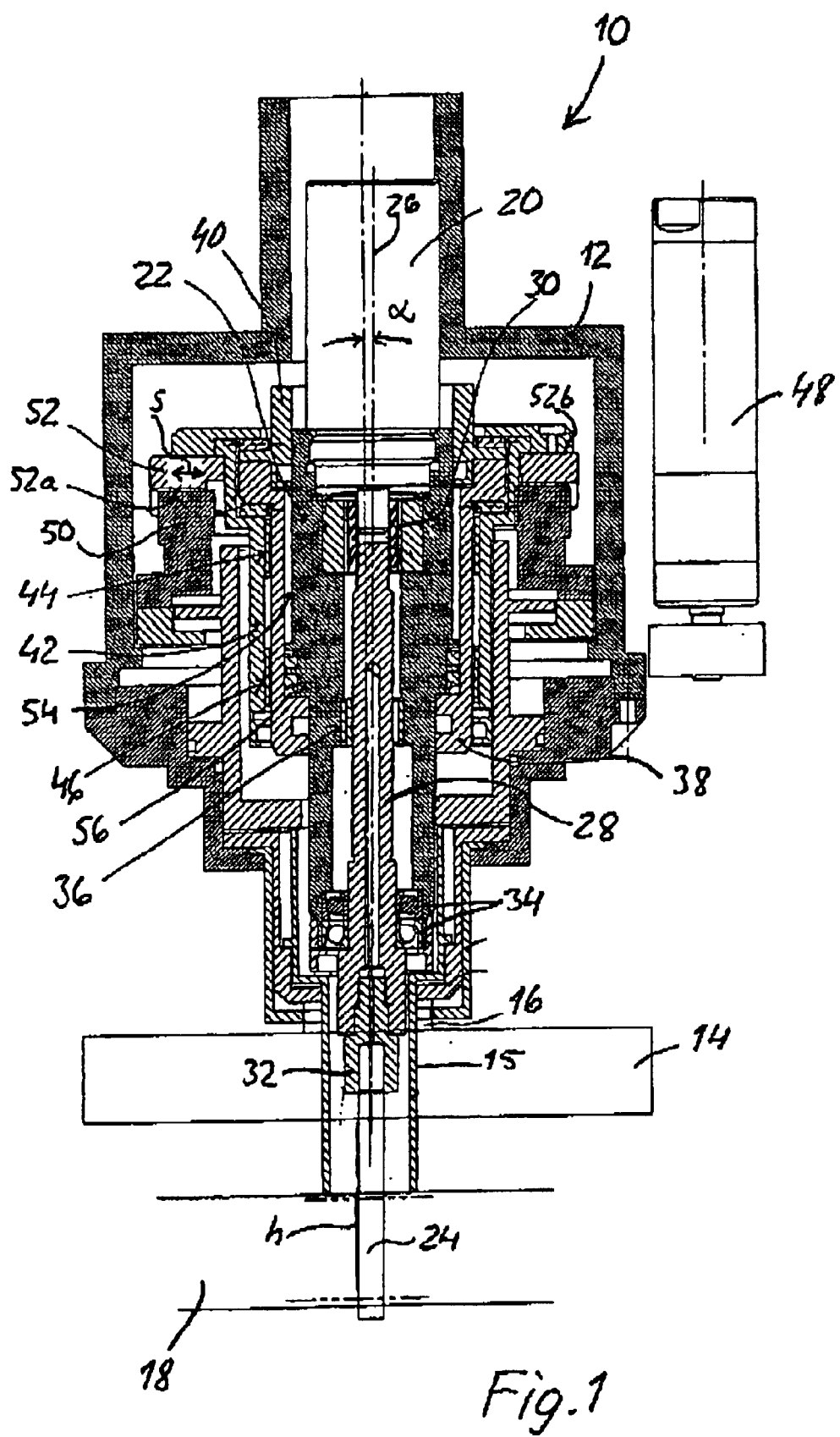
FIG. 1 is longitudinal cross-sectional view of a first embodiment of an apparatus for producing a conical hole in a workpiece according to the present invention.
Figure 2:
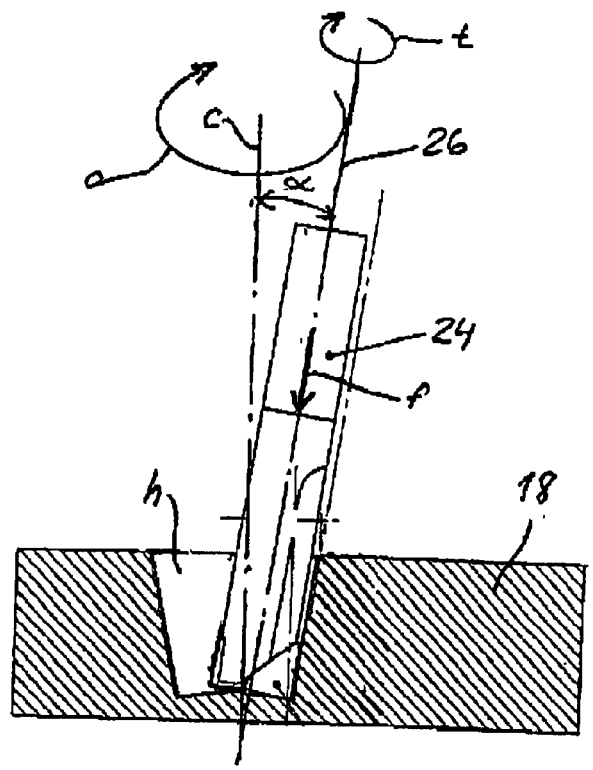
FIG. 2 is schematic side view of a rotating and orbiting cutting tool oriented at an angle α relative to the center axis of a conical hole being produced in accordance with the principle of the invention.

As shown in FIG. 1, an orbital machining apparatus 10 of the present invention for producing a conical hole h or recess generally includes a housing 12 which is detachably mounted to a template 14 by means of a bayonet coupling 16. The template 14 serves as a matrix having guide holes 15 with center axes in positions corresponding to the center axes c (FIG. 2) of the conical holes to be produced. The template 14 is detachably connected to a workpiece 18 in which conical holes are to be formed. A spindle motor 20 is fixed to an inner cylinder 22 and rotates a cutting tool 24 about its own axis 26 (arrow t in FIG. 2) via a shaft 28, which is connected to the spindle motor 20 via a coupling 30 and to the cutting tool via a socket 32. The shaft 28 is rotatably supported in the cylinder 22 via roller bearings 34 and a needle bearing 36. The cylinder 22 is mounted in a further cylinder 38, which is mechanically fixed to a flange element 40 and rotatably mounted to yet another cylinder 42 by needle bearings 44 and 46. A motor 48 rotates via a transmission, e.g. a belt or gear wheels (not shown), an outer cylinder 50. An annular slide member 52, which is radially adjustable relative to the outer cylinder 50 by means of a set screw (not shown), as indicated by the arrow s, can move the assembly of cylinders 42, 38 and 22, and thus the spindle motor 20 radially, thereby to adjust the radial offset of the cutting tool axis 26. This arrangement allows the cutting tool 24 to perform a circular orbital motion about the center axis c of the hole h being formed, as indicated with the arrow o in FIG. 2, by rotating the outer cylinder 50 by means of the motor 48.

In order to allow for the production of conical holes by means of a cylindrical cutting tool head the apparatus of the present invention comprises a mechanism for setting an offset (inclination) angle α of the cutting tool axis 26 relative to center axis c of the hole h. In the embodiment of FIG. 1 this is accomplished by giving a lower surface 52a of the slide member 52 a slant or inclination relative to the its upper surface 52b that corresponds to the angle α. If the angle of taper of the conical hole has to be changed, and thus the tool angle α, the slide member 52 may be dismounted and replaced by another slide member 52 having a lower surface 52a with an inclination relative to the upper surface 52b that corresponds to the desired taper of the hole h. In this manner a desired tool inclination angle α can be preset.

The cutting tool 24 may be fed axially in the direction of the arrow f towards and into the workpiece 18 by displacing the inner cylinder 22 together with the spindle motor 20 relative to the cylinder 38. This could be accomplished by pressurizing an upper cavity 54 between the cylinders 22 and 38. By pressurizing a lower cavity 56 between these cylinders the cutting tool 24 may be retracted from the workpiece 18.

In order to form a conical hole h in a workpiece 18 the desired angle α of the tool axis 26 is preset to match the taper of the hole by mounting a slide member 52 having a relevant inclination of its lower surface 52a. The radial offset value (orbiting diameter) of the cutting tool 24 is then set to match the upper diameter of the conical hole. Then, while simultaneously rotating the cutting tool 24 about its axis 26, rotating (orbiting) the tool 24 about the center axis c of the hole to be formed, and feeding the cutting tool 24 axially along the arrow f (FIG. 2) towards and into the workpiece 18, a conical hole h will be formed therein.

Figure 4:
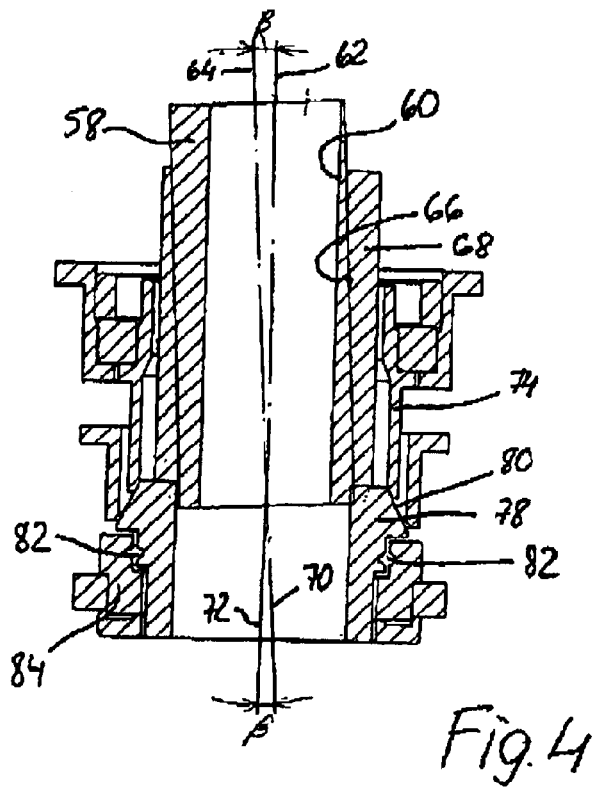
FIG. 4 is a longitudinal cross-sectional view illustrating a mechanism for setting the angle of inclination of the cutting tool.
Figure 3:
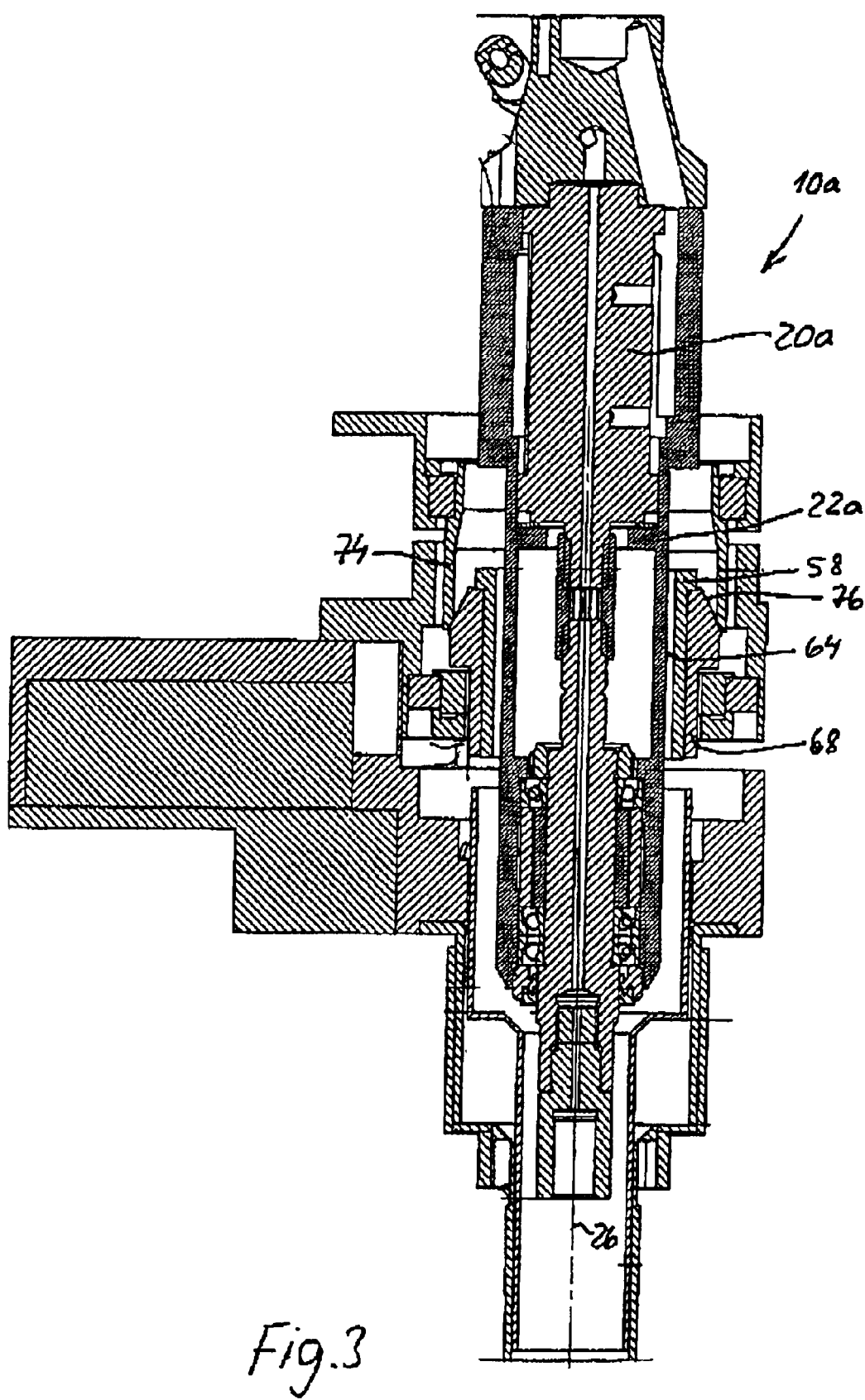
FIG. 3 is a longitudinal cross-sectional view of a second embodiment of an apparatus producing a conical hole in a workpiece according to the present invention.

FIG. 3 and 4 illustrate a further embodiment of the apparatus 10a of the invention wherein the angle α of the cutting tool axis 26 can be continuously adjusted from a value 0, in which the tool axis 26 is coaxial with the hole axis c, to a desired inclination value, without the need of exchanging any mechanical component of the mechanism. To this end the mechanism for setting the angle α of the tool axis 26 comprises an inner cylindrical sleeve 58 having a longitudinal through-hole 60. The center axis 62 of the hole 60 is inclined an angle β relative to the center axis 64 of the cylindrical sleeve 58. The hole 60 of the inner sleeve 58 is, via a bearing 34, adapted to radially and axially guide an inner cylinder 22a in which a spindle motor 20a is supported. The inner cylindrical sleeve 58 is, in its turn, rotatably supported in a longitudinal hole 66 of an outer cylindrical sleeve 68. The center axis 70 of the hole 66 is inclined an angle β relative to the center axis 72 of the outer sleeve 68.

Owing to a suitable choice of the geometric parameters of the inner and outer sleeves 58, 68 and the respective positions and inclinations of the holes therein, the center axis of the hole 60 of the inner sleeve 58, and thus the center axis 26 of the cutting tool 24 radially guided thereby, may be adjusted, by rotating the inner sleeve 58 180° within the outer sleeve 68, between a position in which the center axis 26 of the cutting tool 24 is oriented perpendicular to the upper surface of the workpiece and coaxially with the center axis 72 of the outer sleeve 68, i.e. with a tool axis inclination α=0, and a position with a maximum tool axis inclination α=2β.

In order to obtain a desired radial offset of the tool axis 26, the outer sleeve 68 may be radially displaced by an axially movable slide member 74, which engages a tapered surface 76 of the outer sleeve 68 (FIG. 3) or a tapered surface 80 of a separate block 78 fixed to the sleeve 68 (FIG. 4). As shown in FIG. 4, the block 78 and the outer sleeve 68 are slideable together along two parallel, tangential guides 82 in a lateral direction perpendicular to the plane of the drawing. The slide member 74 is acting on one circumferential half of the block 78 such that the latter is displaced laterally while the slide member 74 is sliding down the tapered surface 80. The block 78 is displaced against the action of compression springs (not shown). The assembly supporting the cutting tool may be brought to rotate, or orbit, about the principal axis c by means of a motor (not shown), which transmits a rotation to a centrically supported base member 84 to which the sliding block 78 is attached.

The embodiment illustrated in FIGS. 3 and 4 thus makes it possible to continuously vary or adjust the setting of the inclination angle α of the cutting tool axis 26 without exchanging any components of the apparatus. This is accomplished simply by rotating the inner sleeve 58 relative to the outer sleeve 68 up to 180°. The tool axis 26 may be set between α=0, such that a cylindrical hole may be drilled in a workpiece, and α=2β, such that a conical hole having a maximum cone angle can be produced.

The rotary position of the inner sleeve 58 is normally adjusted manually and then fixated to the outer sleeve 68 by any suitable mechanical locking means. However, it is conceivable to accomplish the setting of the rotary position of the inner sleeve 58 by means of a step motor (not shown) via any suitable transmission, such as a belt transmission, gear wheels and couplings compensating for mutually inclined axes. By such an arrangement it would be possible to continuously varying the tool axis inclination while simultaneously feeding the cutting tool axially during the working operation such that holes having a convex or concave wall section may be produced.

Also, it should be noted that conical holes having an upper diameter, which is smaller than the bottom diameter, can be produced by offsetting the cutting tool axis 26 to a negative value.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for producing a conical hole in a workpiece by using a cutting tool having a substantially cylindrical cutting head, said method comprising the steps of:
   positioning a longitudinal center axis of the cutting tool at an angle, which is offset from a normal to a flat surface of the workpiece such that the inclination of the longitudinal axis of the cutting tool substantially corresponds to the desired inclination of the wall of the conical hole to be formed;
   rotating the cutting tool about its longitudinal center axis;
   moving the cutting tool in a circular path about a principal axis corresponding to a longitudinal center axis of the hole to be machined; and
   feeding the cutting tool in its longitudinal direction towards and into the workpiece to form a conical hole therein.

2. A method for machining in a workpiece a hole having a curved wall by using a cutting tool having a substantially cylindrical cutting head, said method comprising the steps of:
   positioning a longitudinal center axis of said cutting tool at an angle, which is offset from a normal to a flat surface of said workpiece;
   rotating the cutting tool about its longitudinal center axis;
   moving the cutting tool in a circular path about a principal axis corresponding to a longitudinal center axis of the hole to be formed; and
   varying the angle of inclination of the longitudinal center axis of the cutting tool while simultaneously feeding the cutting tool axially in its longitudinal direction towards and into the workpiece to form a curved section of a hole therein.

3. An apparatus for producing a conical hole in workpiece by using a cutting tool having a substantially cylindrical cutting head, said apparatus comprising:
   a first actuator including a spindle unit configured for carrying and rotating said cutting tool about a longitudinal center axis thereof;
   a second actuator configured for moving the cutting tool in an axial feed direction;
   a mechanism configured for rotating the cutting tool eccentrically about a principal axis corresponding to a longitudinal center axis of the hole to be formed;
   a mechanism configured for setting the angle of inclination of the longitudinal axis of the cutting tool relative to the principal axis; and
   a mechanism configured for setting a radial offset of the cutting tool relative to the principal axis;
   wherein said mechanism for setting the angle of inclination of the cutting tool comprises an inner cylindrical sleeve having a longitudinal through-hole, a longitudinal center axis of said through-hole being inclined an angle relative to a longitudinal center axis of said inner cylindrical sleeve, said through-hole of the inner sleeve being arranged to radially and axially guide a spindle unit for rotating said cutting tool about its longitudinal center axis; and an outer cylindrical sleeve having a hole with a longitudinal center axis that is inclined an angle relative to a longitudinal center axis of said outer cylindrical sleeve, said inner cylindrical sleeve being rotatably supported within said hole of the outer cylindrical sleeve so as to set the angle of inclination of the longitudinal center axis of the cutting tool.

4. An apparatus according to claim 3, wherein said angles of inclination of said holes in said inner and outer cylindrical sleeves are equal, and wherein the positions of said holes are such that in a first mutual rotary position of the inner and outer sleeves the longitudinal center axis of said through-hole of the inner sleeve is coaxial with the longitudinal center axis of the outer sleeve, and in a second mutual rotary position, that is offset 180° from said first position, a maximum angle of tool inclination is obtained.

5. An apparatus for producing a conical hole in workpiece by using a cutting tool having a substantially cylindrical cutting head, said apparatus comprising:
   a first actuator including a spindle unit configured for carrying and rotating said cutting tool about a longitudinal center axis thereof;
   a second actuator configured for moving the cutting tool in an axial feed direction;
   a mechanism configured for rotating the cutting tool eccentrically about a principal axis corresponding to a longitudinal center axis of the hole to be formed;
   a mechanism configured for setting the angle of inclination of the longitudinal axis of the cutting tool relative to the principal axis; and a mechanism configured for setting a radial offset of the cutting tool relative to the principal axis;

wherein said mechanism for setting the angle of inclination of the cutting tool comprises an exchangeable member which has a flat surface oriented at a fixed angle of inclination relative to a plane perpendicular to said principal axis, said angle corresponding to the desired inclination of said cutting tool axis.

* * * * *